United States Patent [19]

Ocvirk

[11] Patent Number: 4,838,619
[45] Date of Patent: Jun. 13, 1989

[54] HYDRAULIC BRAKE SYSTEM FOR AUTOMOTIVE VEHICLES

[75] Inventor: Norbert Ocvirk, Offenbach, Fed. Rep. of Germany

[73] Assignee: Alfred Teves GmbH, Frankfurt am Main, Fed. Rep. of Germany

[21] Appl. No.: 185,247

[22] Filed: Apr. 19, 1988

Related U.S. Application Data

[63] Continuation of Ser. No. 10,987, Feb. 5, 1987, abandoned.

[30] Foreign Application Priority Data

Feb. 6, 1986 [DE] Fed. Rep. of Germany ....... 3603697

[51] Int. Cl.$^4$ ........................... B60T 8/44; B60T 15/36
[52] U.S. Cl. ..................................... 303/114; 303/54; 303/60; 303/119; 60/589; 60/591
[58] Field of Search ............... 303/113, 114, 115, 116, 303/119, 52, 54, 59, 60, 61; 60/547.1, 589, 591

[56] References Cited

U.S. PATENT DOCUMENTS

| 4,066,301 | 1/1978 | Harries ................................ | 303/115 |
| 4,555,144 | 11/1985 | Belart et al. .................... | 303/119 X |
| 4,643,488 | 2/1987 | Reinartz .............................. | 303/114 |
| 4,655,512 | 4/1987 | Leiber ................................. | 303/114 |
| 4,687,259 | 8/1987 | Reinartz et al. .................. | 303/52 X |
| 4,703,978 | 11/1987 | Belart et al. ..................... | 303/119 X |

Primary Examiner—Andres Kashnikow
Assistant Examiner—Timothy Newholm
Attorney, Agent, or Firm—James B. Raden

[57] ABSTRACT

A brake system for automotive vehicles, comprising a tandem master cylinder (1) and a vacuum brake force booster (2). A pump (34) is connected to the supply chambers (10, 11) of the tandem master cylinder (1), which pump is actuated by an electromotor (35) started by a brake slip control device to replenish, in the brake slip control, the pressure fluid volume discharged from the working chambers (4, 5) of the tandem master brake cylinder (1), by way of the supply chambers (10, 11) and the sleeves of the master cylinder pistons (6, 7). To control the pump pressure, a pressure control valve (36) is provided to the control chamber (37) of which a control pressure is applied, which is generated in a control chamber (23) by a control piston (24) coupled ahead of the tandem master brake cylinder (1). The control chamber (23), by way of a magnetic valve (39), is pressure-relieved when the brake slip control device is turned off.

9 Claims, 1 Drawing Sheet

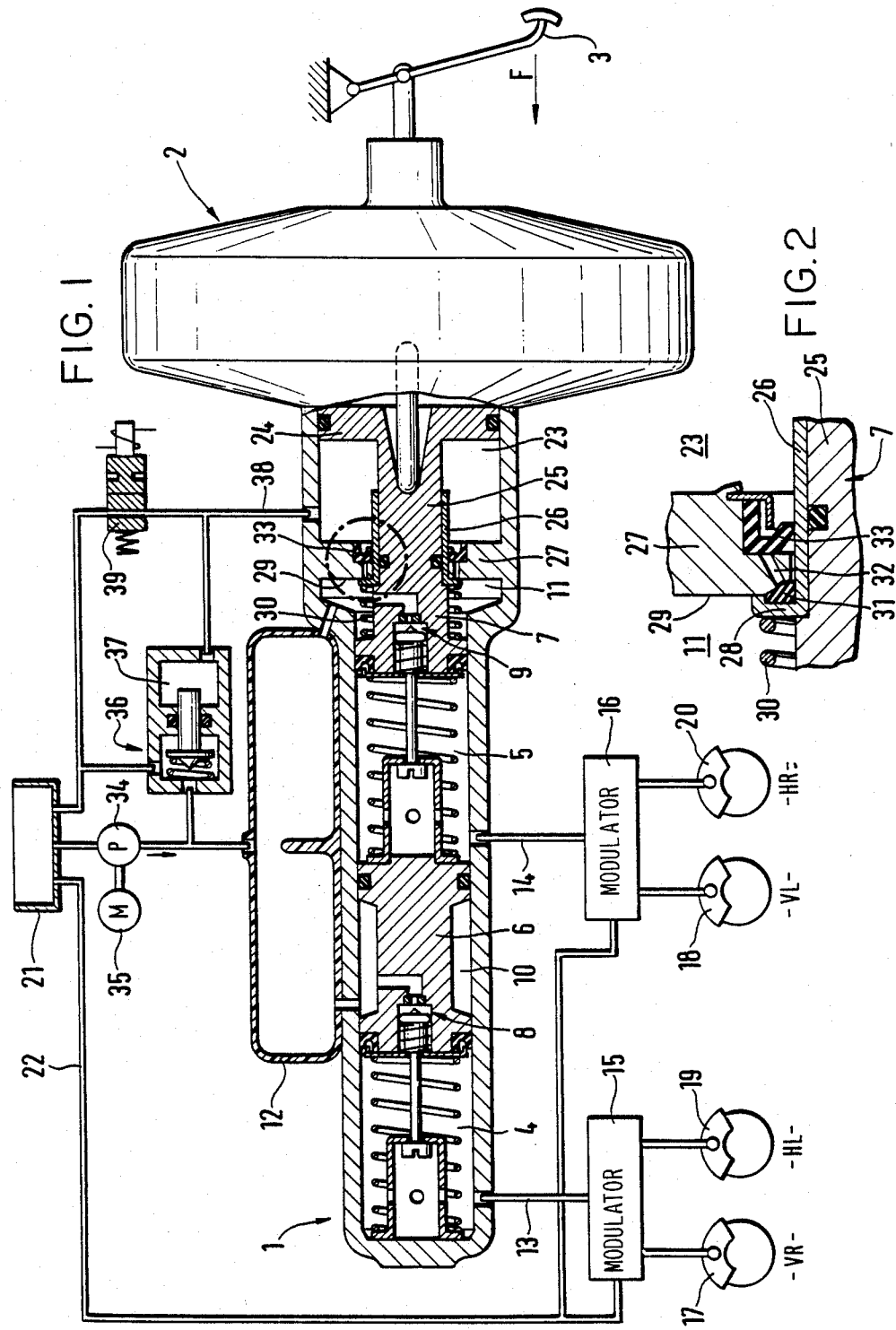

HYDRAULIC BRAKE SYSTEM FOR AUTOMOTIVE VEHICLES

This application is a continuation of application Ser. No. 010,987, filed 2/5/87, now abandoned.

BACKGROUND OF THE INVENTION

The present invention relates to a hydraulic brake system for automotive vehicles, comprising a master brake cylinder including a supply chamber connectible to a non-pressurized reservoir, and a working chamber in communication with a brake line leading to pressure control valves of a brake slip control device coupled to which is at least one wheel brake.

During operation of the brake slip control device, in brake systems of the afore-described type, the repeated actuation of the wheel brake after a pressure relief requires a pressure fluid amount largely exceeding the supply capacity of the master brake cylinder in an actuating process. It is, therefore, necessary that, during operation of the brake slip control device, pressure fluid from an additional pressure fluid source, for example, an electronically operated energy supply system independent of the master brake cylinder, be supplied to the wheel brake. Moreover, it is necessary for the master brake cylinder, during operation of the brake slip control device, to be kept in an actuating position which, upon failure of the brake control device or the energy supply system, will safeguard operation of the wheel brake until standstill of the vehicle.

In a conventional brake system as disclosed, for example, by DE-OS No. 30 40 562 wherein, for actuating the master brake cylinder, a brake force booster energized by a hydraulic energy supply system is provided, the supply chamber of the master brake cylinder, by way of an electromagnetically operable control valve of the brake slip control device and a hydraulically controllable valve unit coupled to the control valve, is connectible to the booster chamber of the brake force booster in order to supply, during operation of the brake slip control device, the wheel brake cylinders in communication with the working chamber with pressure fluid from the energy supply system of the brake force booster, by way of the supply chamber, the piston sleeve and the working chamber of the master brake cylinder. Moreover, a positioning piston is provided, in the prior brake system, in the supply chamber of the master brake cylinder, which positioning piston, upon a pressure being applied to the supply chamber, is movable toward a housing stop to keep the master cylinder piston in a ready-for-operation condition thereby safeguarding an operation of the brake in the event of a failure or defective condition of the energy supply or the brake slip control. The above configuration of the brake system involves the disadvantage that it is applicable only in connection with a hydraulic brake force booster through which the pressure supplied to the supply chamber of the master brake cylinder is controlled in proportion to the exerted actuating force. Also, it is a disadvantage of the prior brake system that the serviceability of the hydraulic brake force booster and that of the brake slip control device are dependent of one another. Moreover, the prior art brake system is relatively complex and costly thus being unsuitable for use with vehicles of a lower price category.

It is an object of the present invention to provide, in a brake system of the afore-mentioned type, an additional energy supply for the operation of the brake slip control device independent of the actuating system of the master brake cylinder and exhibiting low construction cost.

SUMMARY OF THE INVENTION

This problem, in the practice of the invention, is solved in that pressure fluid from a pressure fluid source can be fed to the supply chamber of the master brake cylinder upon commencement of the brake slip control device the outlet pressure of which is controllable by a pressure control valve in response to the actuating force exerted on the master brake cylinder, thereby providing a hydraulic brake system for automotive vehicles in which, for actuating the master brake cylinder, any conventional and proven actuating system can be employed both with and without brake force boosting and in which, at the same time, the wheel brake or brakes are controllable by a brake slip control device, with the amount of pressure fluid required therefore being supplied by an additional pressure fluid source the construction of which requires but minor efforts, with the said additional pressure fluid source being connectible to the master brake cylinder. Feeding the pressure from the pressure fluid source into the supply chamber of the master brake cylinder involves the advantage that no additional valve-controlled connection between the working chamber of the master brake cylinder and the wheel brakes is required involving enhanced safety against a failure of the brake system. The pressure fluid source may be simple in construction as it is required only for the supply in the event of a brake slip control rather than in each and every application of the brakes.

The pressure fluid source, in the brake system according to the invention, may be in the form of a pump the drive of which is controllable by the brake slip control device. This involves the advantage that no special control valves for connection of the pressure fluid source are required and that the additional pressure energy is generated only during operation of the brake slip control device.

This will result in a favorable energy balance and a reduced starting time of the pump thereby enabling the pump and the pump drive to be manufactured at particularly low costs.

The pressure control valve, in the practice of the invention, is so configured that the quotient from the actuating force on the master brake cylinder and the outlet pressure of the pressure fluid source approximately corresponds to the effective piston surface of the master cylinder piston. With such a configuration of the pressure control valve, the outlet pressure of the pressure fluid source respectively corresponds to the brake pressure in the working chamber of the master brake cylinder so that the connection of the pressure fluid source does not cause any detrimental pressure pulses.

According to a preferred form of embodiment, the pressure control valve provided between the pump outlet and the non-pressurized reservoir is a throttle valve to the control piston of which, in the opening direction, the pump pressure is applied, whereas, in the closing direction, a control system transferring the actuating force at the master cylinder is applied thereto. A valve of this type is simple in construction and permits a sensitive pressure control.

The control system, advantageously, may be composed of a control chamber disposed on the inlet of the master brake cylinder, and a control piston movable into the control chamber and coupled ahead of the master cylinder piston, with the control chamber being connected to the pressure control valve and, by way of a valve passage blockable during driving of the pressure fluid source, to a non-pressurized reservoir.

The control system, hence, is composed of a simple piston/cylinder arrangement effective only during driving of the pressure fluid source through the brake slip control device such that the normal brake actuating processes are not affected. As the control device during operation of the brake slip control device forms a closed chamber system, in this phase of operation it also serves to limit the actuating stroke of the master cylinder piston such that the master cylinder piston cannot be moved through but remains in a ready-for-operation condition.

The path of the control piston and, hence, of the master cylinder piston, moreover, can be limited by a piston sleeve which, toward the control piston, can be urged by the pressure on the pump outlet against a housing stop. The master cylinder piston, through the piston sleeve, may be pushed back into the required ready-for-operation position if, upon commencement of the brake slip control, it has already performed an excessive actuating stroke. The invention, moreover, provides that by removing the piston sleeve from the housing stop, a valve will be actuable from its closed position into an open position, connecting the control chamber to the pump outlet, thereby safeguarding that, during retraction of the master cylinder piston and the control piston, an adequate pressure is maintained in the control chamber to drive the pressure control valve.

In a preferred form of embodiment of the invention, the piston sleeve surrounds a connecting rod between control piston and master cylinder piston, passing through a wall separating the control chamber from the supply chamber of the master brake cylinder and forming the housing stop. For this, the piston sleeve, in the supply chamber, may comprise an annular flange including a sealing element which, for forming a closeable valve, may abut the wall. The valve connecting the supply chamber to the control chamber will thus be closed only if the piston sleeve with the annular flange thereof has reached the housing stop. Preferably, the wall is sealed from the piston sleeve by a supply collar opening in the control chamber. In the control chamber, also with the valve opened, a control pressure can be developed thereby safeguarding, in any position of the master cylinder piston, driving of the pressure control valve and throttling of the pump flow.

According to another embodiment of the invention, the supply chamber of the master brake cylinder may be in direct communication with the pump outlet, with the pressure control valve opened during standstill of the pump, establishing the connection to the non-pressurized reservoir. Due to this simple arrangement, special valve means closing the reservoir outlet of the intake chamber may be eliminated.

Actuating the master brake cylinder, in the practice of the invention, can be performed by a brake force booster, preferably a vacuum brake force booster. Feasibly, the brake force booster is actuated independently of the pressure fluid source thereby remaining serviceable in the event of a failure of the pressure fluid source. When actuating the master brake cylinder by a vacuum brake force booster, according to an alternative form of embodiment of the principle of the invention, the pressure control valve may be pneumatically controllable by the pressure prevailing in the two working chambers of the vacuum brake force booster coupled ahead of the master cylinder, instead of by the pressure in the control chamber. This pneumatic pressure will be applied to the control valve when operation of the control system is desired. As an earlier-described embodiment, the control chamber is connected to a non-pressurized reservoir by way of a valve passage blockable during driving of the pressure fluid source. Necessarily, the application of pneumatic pressure to the pressure control valve will be regulated by a separate valve passage openable during driving of the pressure fluid source. If feasible, both passages can be controlled by means of a single valve. No additional control device will, therefore, be required.

The invention, advantageously, can also be employed with a tandem master brake cylinder in that both supply chambers of the tandem master brake cylinder are connectible to the outlet of the pressure fluid source.

BRIEF DESCRIPTION OF THE DRAWING

The invention will now be described in greater detail with reference to the drawing in which FIGS. 1 and 2 illustrate a hydraulic brake system in accordance with the present invention.

DETAILED DESCRIPTION

FIG. 1 shows a wiring diagram of a hydraulic dual circuit brake system for an automotive vehicle, comprising a brake pressure generator formed by a tandem master brake cylinder 1 and a vacuum brake force booster 2 and being actuable by a brake pedal 3.

The tandem master brake cylinder 1 shown in sectional view, comprises two separate working chambers 4, 5 that can be reduced in size by an actuating stroke of the master cylinder pistons 6, 7. The working chambers 4, 5, by way of central valves 8, 9 open in the basic position as shown, can be connected to supply chambers 10, 11 in communication with a supply tank 12.

Brake lines 13, 14 lead from the working chambers 4, 5 of the tandem master brake cylinder 1 to brake pressure modulators 15, 16 connected to which are the wheel brakes 17, 18 of the front axle of an automotive vehicle, and the rear brakes 19, 20 of the rear axle of the automotive vehicle, with the wheel brakes 17, 19 and 18, 20, respectively connected to a brake pressure modulator 15 and 16, respectively, relative to the vehicle, being disposed in diagonal relationship with respect to one another. The brake pressure modulators 15, 16 are so controlled by a brake slip control device (not shown) that they connect the wheel brakes alternately to the brake line 13 and 14, respectively, or to a return line 22 leading to a non-pressurized reservoir 21 to thereby preclude a blocking of the wheel brakes. In the basic non-driven position, the brake pressure modulators 15, 16 have free passage from the brake lines 13, 14 to the wheel brakes 17 to 20.

Provided between the supply chamber 11 of the tandem master brake cylinder 1 and the vacuum brake force booster 2 is a control chamber 23 in which is disposed an axially displaceable control piston 24 which, by way of a connecting rod 25, is in communication with the master cylinder piston 7. The connecting rod 25 is surrounded by a piston sleeve 26 extending through the wall 27 separating the supply chamber 11 from the control chamber 23 and, in the supply chamber 11, comprising an annular flange 28 capable to abut the front face 29 of the wall 27.

FIG. 2 shows the features of the piston sleeve 26, the connecting rod 25, and the wall 27 in greater detail.

Disposed between the annular flange 28 and a step face of the master cylinder piston 7 is a compression spring 30 keeping the annular flange 28 in abutment with the front face 29. Provided on ring flange 28 is a sealing element 31 which, with the front face 29 thereof forms a valve passage 32 closeable in pressure-tight manner. Contained in the bore of wall 27, moreover, is a supply sleeve 33, the sealing lip of which conforms to the cylindrical face of the piston sleeve 26 and which, with the valve passage 32 opened, permits a passage of pressure fluid from the supply chamber 11 into the control chamber 32.

The supply tank 12 is connected to the outlet of a pump 34 actuacted by an electromotor 35 controllable by the brake slip control device. In parallel to pump 34, the supply tank 12 is connected to a pressure control valve 36 which, in its basic position, is kept open by a spring thereby having free passage to reservoir 21. A control chamber 37 of the pressure control valve 36, by line 38, is in communication with the control chamber 23 of the tandem master brake cylinder 1. Moreover, the control chamber 23, by way of a dead open magnetic valve 39, is connected to reservoir 21, which valve is driven upon starting of the electromotor 35 and is closed thereby.

The way of operation of the brake system as described will now be explained in closed detail:

To initiate a braking operation, the brake pedal 3 is actuated by a force. F and the vacuum brake force booster 2 driven. The vacuum brake force booster 2 thereby moves the control piston 24 and the two master cylinder pistons 6, 7 into the tandem master brake cylinder 1 thereby first closing the central valves 8, 9 and separating the working chambers 4, 5 from the supply chambers 10, 11. By further displacing the master cylinder pistons 6, 7, subsequently, a pressure is built up in the working chambers 4, 5, propagating by way of brake lines 13, 14 and open brake pressure modulators 15, 16 to the wheel brakes 17 to 20 actuating the same in accordance with the actuating force F exerted on the brake pedal 3. The pressure fluid displaced by the movement of the control piston 24 into the control chamber 23, by way of the open magnetic valve 39, is passed into reservoir 21. The pump 34, in that phase of actuation, is not operated. The supply chambers 10, 11, by way of supply chamber 12 and pressure control valve 36, therefore, will remain in permanent communication with reservoir 21.

If, during such a braking operation, a blocking tendency of a vehicle wheel is detected by the brake slip control device, the electromotor 35 will be started and the pump 34 actuated with full capacity. At the same time, the magnetic valve 39 is driven and the connection between control chamber 23 and reservoir 21 discontinued. Now a minor actuating stroke of the control piston 24 will already be sufficient for closing the pressure control valve 36 so as to enable a pressure to be built up on the pump outlet, which propagates, by way of supply tank 12, into supply chambers 10, 11 enabling pressure fluid to flow into the working chambers 4, 5, by way of the sleeves of the master cylinder pistons 6, 7. Upon starting pump 34, the brake pressure modulators 15, 16 are driven by the brake slip control device to preclude, by a periodical pressure build-up and pressure decrease in the wheel brakes 17 to 20, a blocking of the motor vehicle wheels. The pressure fluid volume required for these control operations, is taken from the working chambers 4, 5 of the tandem master brake cylinder 1, with the pressure fluid volume discharged being directly replenished from the supply chambers 10, 11 into the working chambers 4, 5.

The pressure on the pump outlet and on the supply chambers 10, 11 coupled to the pump outlet and on the working chambers 4, 5 in this phase of actuation, is controlled by the pressure control valve 36 which, along with the control piston 24, is so designed as to safeguard the same proportionality to the actuating force exerted on the brake pedal 3 as in the development of the brake pressure by actuation of the master cylinder piston 6, 7. The face of action of the control piston 24, moreover, is dimensioned such that the control pressure in the control chamber 23 amounts to about $\frac{1}{3}$ of the pumping pressure.

The pressure gradient between the control chamber 23 and the supply chamber 11 causes a pressure force to become effective on the piston sleeve 26 that keeps the valve passage 32 closed. The control chamber 23 and the control chamber 37, hence, form, in this phase of actuation, in which the magnetic valve 39 is closed, a closed chamber system from which no pressure fluid can escape with no substantial pressure increase. In this manner, with the aid of the control piston 24, the tandem master brake cylinder 1 is held in a ready-for-operation condition safeguarding a safe actuation of the brake upon failure of the brake slip control device.

If the control piston 24, upon commencement of operation of the brake slip control and of the drive of the electromotor 35 connected thereto and of the magnetic valve 39, is in a position advanced to such an extent that it is in abutment with the piston sleeve 26, with the annular flange being already removed from the front face 29 at the wall 27, the pressure fluid delivered by the pump 34, upon exceeding the pressure in the control chamber 23, by way of the open valve passage 32 and the supply sleeve 33, will be passed into the control chamber 23 thereby pushing the control piston 24 back to such a degree that the annular flange 28 reaches the wall 27 and the sealing element 31 closes the valve passage 32, thereby safeguarding that during operation of the brake slip control device, the master cylinder piston 7 connected to the control piston 24 will get into the required ready-for-operation position if, even upon commencement of the brake slip control, an actuation beyond the ready-for-operation position has already been performed.

What is claimed is:

1. A hydraulic brake system for automotive vehicles, comprising a master brake cylinder including a supply chamber connectible to a non-pressurized reservoir, and a working chamber connected to which is a brake line leading to pressure control valves of a brake slip control device, coupled to which is at least one wheel brake; wherein upon commencement of the operation of the brake slip control device, pressure fluid from a pressure fluid source is admitted to the supply chamber of the master brake cylinder, said pressure fluid source comprising a pump having a pump drive which is controllable by the brake slip control device, with an outlet pressure of said pressure fluid source on the master brake cylinder being controllable by a pressure control valve operated by a fluid pressure in response to an actuating force exerted on the master brake cylinder, said pressure control valve being so configured that braking pressure is produced in a proportionality to a brake pedal actuating force which is the same as that of a braking pressure produced by the master brake cylinder when brake slip control is inoperative; wherein the pressure control valve provided between a pump outlet and the non-pressurized reservoir is a throttle valve having a first control piston to which, in an opening direction, is applied the pump outlet pressure and, in a closing direction, is applied a fluid pressure from a control device transferring the actuating force; wherein the control device comprises a control chamber disposed at an inlet of the master brake cylinder and a second control piston movable into the control chamber and operatively connected to a pedal side of a master cylinder piston; and wherein the control chamber is in communication with the pressure control valve via a pressure fluid passage and, by way of a valve passage blockable during driving of the pressure fluid source, is in communication with the non-pressurized reservoir, said valve passage being closed by an electromagnetically actuated shut-off valve which is controlled by said brake slip control device.

2. A brake system according to claim 1 wherein travel of the second control piston is limited during operation of the brake slip control device by a piston sleeve which is urged toward the second control piston and against a housing stop by the pump outlet pressure.

3. A brake system according to claim 2, wherein by lifting the piston sleeve from the housing stop, a valve is moved from its closed position into its open position to connect the control chamber to the pump outlet.

4. A brake system according to claim 3, wherein the piston sleeve surrounds a connecting rod between the second control piston and the master cylinder piston, and passes through a wall separating the control chamber from the supply chamber of the master brake cylinder and forming the housing stop.

5. A brake system according to claim 4, wherein the piston sleeve in the supply chamber comprises an annular flange, including a sealing element which is able to conform to the wall to form a closeable valve.

6. A brake system according to claim 5, wherein the wall is sealed against the piston sleeve by a supply collar opening the control chamber.

7. A brake system according to claim 6, wherein the supply chamber of the master brake cylinder is in direct communication with the pump outlet and, by way of the pressure control valve open during standstill of the pump, is in communication with the non-pressurized reservoir.

8. A brake system according to claim 6, wherein the master brake cylinder is operable by a vacuum brake force booster.

9. A brake system according to claim 6, wherein the master brake cylinder is a tandem master brake cylinder the supply chambers of which are jointly connectible to the pressure fluid source.

* * * * *